April 25, 1939.  A. SCHMIDT  2,155,958
SHELL ASSEMBLING MACHINE
Filed Feb. 3, 1937  5 Sheets-Sheet 1

INVENTOR
ALFRED SCHMIDT
BY
ATTORNEY

April 25, 1939.    A. SCHMIDT    2,155,958

SHELL ASSEMBLING MACHINE

Filed Feb. 3, 1937    5 Sheets-Sheet 5

INVENTOR
ALFRED SCHMIDT
BY
ATTORNEY

Patented Apr. 25, 1939

2,155,958

UNITED STATES PATENT OFFICE 2,155,958

SHELL ASSEMBLING MACHINE

Alfred Schmidt, Weehawken, N. J.

Application February 3, 1937, Serial No. 123,782

18 Claims. (Cl. 29—84)

This invention relates to new and useful improvements in a shell assembling machine.

The invention has for an object the construction of an assembling machine as mentioned which is capable of placing a washer, preferably an insulation washer, into the beaded end of a hollow shell and then placing an eyelet into the center of the washer and clamping the parts together into a unit. The shell may be used as the socket for an electric lamp or other purposes.

The invention particularly contemplates characterizing the hollow shell with a flange end and a beaded end and to have the bead of the beaded end spaced inwards of the end portion thereof so that there is sufficient material to be bent over to hold an inserted washer in position.

In respect to the machine it is proposed to make use of a chute for supplying and holding the hollow shells and to associate a pin with this chute for receiving one of said shells at a time and holding the shell with the beaded end at its outer end.

It is further contemplated to provide another chute for supplying and holding washers with center openings adapted to fit into the beaded end of said shell and rest on the bead thereof and to provide a means for depositing one of said washers into the beaded end of the shell on said pin and clamping the end of the shell a small amount sufficient to hold the washer in place on the bead.

Furthermore, the invention contemplates the provision of a third chute for supplying and holding eyelets adapted to fit into the center openings of said washers and to associate a means with this third chute for depositing one of said eyelets into the central opening of the washer which is held in said shell which is upon said pin.

Still further the invention contemplates the provision of a punch for coacting with said pin for clamping said eyelet, said washer and said shell into a fixed unit.

Furthermore, the invention proposes the provision of means for removing said shell unit from the pin after it has been completely formed.

The invention contemplates to mount the pin on a moving member arranged to move in a predetermined path, in steps of pre-determined time and to arrange the various mechanism previously pointed out in conjunction with the member so that the various steps of forming the completed article take place in sequence.

Another one of the objects of this invention is to provide the member with a plurality of pins and an arrangement whereby different steps of the manufacture of the shell assembly take place simultaneously during the operation of the member.

Another object is the construction of a machine as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Figure 10:
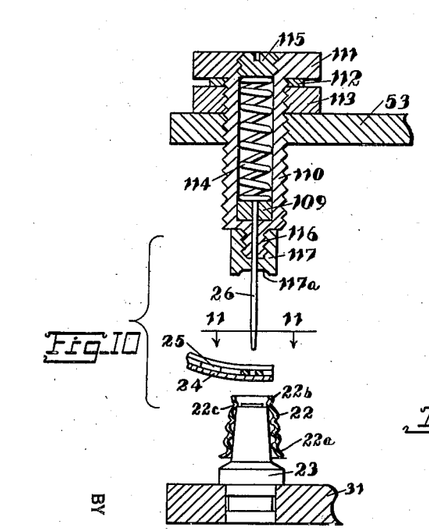
Fig. 10 is a sectional view taken on the line 10—10 of Fig. 2.
Figure 12:
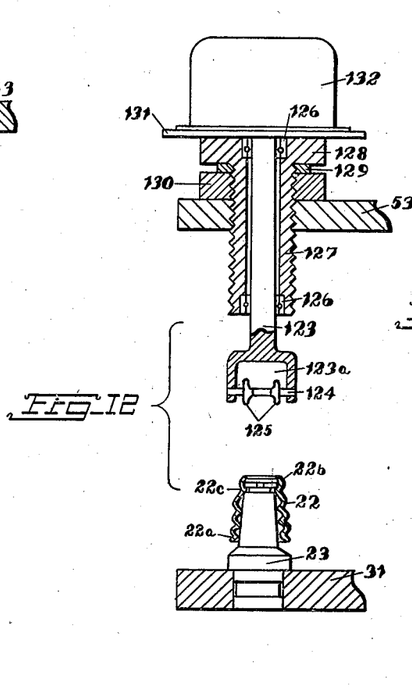
Fig. 12 is a sectional view taken on the line 12—12 of Fig. 2.

In a general way the shell assembling machine includes a chute 21 for supplying and holding hollow shells 22, each of which has a flange end 22a and a beaded end 22b with the bead 22c thereof (see Fig. 10) spaced in slightly from the end. A pin 23 is provided for receiving one of the shells 22 and holding said shell with the beaded end at the outer end of the pin. A chute 24 is arranged for supplying and holding washers 25 (see Fig. 10) with central openings and adapted to fit into the beaded end of the shell 22 and to rest on the bead portion 22c. A means is associated with the chute 24 for depositing one of the washers 25 into the beaded end of the shell 22 which is on the pin 23 and clamping the beaded edge portion of the shell slightly to hold the washer 25 in place on said bead (Fig. 12 shows the washers held in place on the bead 22c by a slightly clamping of the bead end of the shell). The means for so depositing the washers includes an operating pin 26 and is partially shown in detail in Fig. 10.

Figure 15:
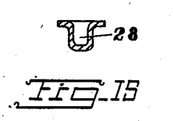
Fig. 15 is an enlarged sectional view of one of the eyelets from the chute shown in Fig. 13.

There is a third chute 27 for supplying and holding eyelets 28 (see Figs. 13 and 15) adapted to fit into the center openings of the washers 25. A means is associated with the chute 27 for depositing one of the eyelets 28 into the central opening of the washer 25 which is held in the shell 22 which is on the pin 23. There is also a punch device which includes a punch head 29 which coacts with said pin 23 for clamping said eyelet, said washer and said shell into a fixed unit. A means is also provided for removing the fixed unit from the pin and includes several hooked gripper fingers 30 shown in detail in Figs. 17 and 18. This completes a brief description of the machine.

A brief description of the operation of the machine is as follows: The pin 23 is caused to receive one of the shells 22 from the chute 21. The pin 23 is then caused to assume various positions and at the various positions various things take place. At one position the pin is in the vicinity of the chute 24 and a means deposits one of the washers 25 into the beaded end of the shell and slightly clamps the edge so that the washer cannot come out. In another position of the pin an eyelet 28 is deposited into the central opening of the washer and is slightly clamped so that it cannot come out. In another position a punch tightly clamps together the shell, washer and eyelet. In still another position the assembled shell unit is removed from the pin.

A complete detailed description of the machine is as follows: The pin 23 is mounted on a disc shaped member 31. On this member there are a plurality of similar pins 23 equally spaced from each other and the machine is arranged to simultaneously operate with all of the pins. In all there are ten pins 23 on the disc member 31 and the disc member 31 is associated with a ten point Geneva drive so that the disc 31 rotates one-tenth of a revolution periodically and continues indefinitely to rotate. The disc member 31 is attached to a bushing 32 which engages through a bearing 33 mounted upon the table 34 of the machine. The bushing 32 extends through the bearing 33 to the bottom side of the table 34 and there connects with the large toothed wheel 35 of the Geneva drive. This wheel 35 is cooperative with the wheel 36 supporting the Geneva pin 37. The wheel 36 is mounted on a shaft 37 rotatively supported in a bearing 38 mounted upon a bracket 39 which is attached to the bottom face of the table 34. The shaft 37 is provided with a bevel gear 40 which meshes with a bevel gear 41 on the main shaft 42 of the machine. This main shaft is supported by a bearing 39' formed on the lower end of the bracket 39, and another bearing 43' formed in the lower end of a bracket 43 which is spaced from the bracket 39 and which is attached to the bottom face of the table 34.

The shaft 42 is provided with a large gear 44 which meshes with a small pinion 45 on a shaft 46 rotatively supported in the standards 47 mounted on the bottom face of the table 34. A pulley 48 is mounted upon the shaft 46 and is engaged by a belt 49 which extends downwards and over the pulley 50 of an electric motor 51. This electric motor is mounted on a frame 52 which also supports the table 34. It should be noted that rotations from the motor 51 will be transmitted to rotate the disc member 31 in steps of one-tenth of a revolution at a time.

Figure 1:
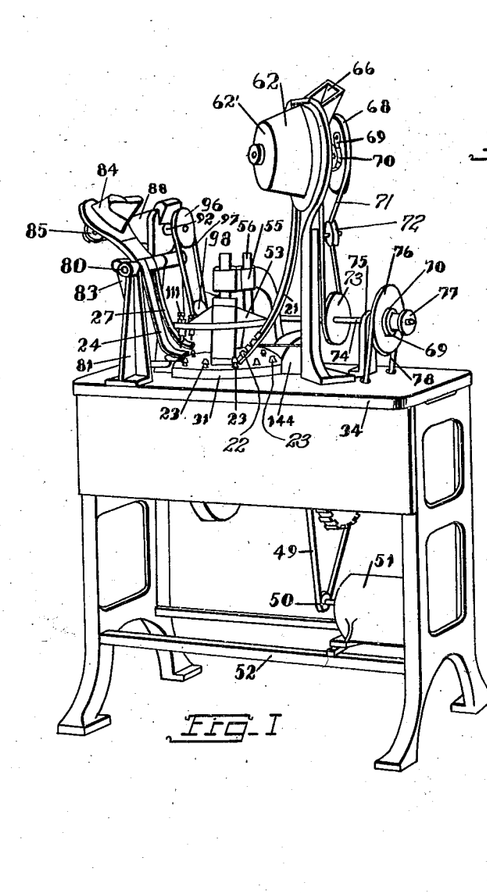
Fig. 1 is a perspective view of a shell assembling machine constructed according to this invention.
Figures 2, 4, 8, 11, 20:
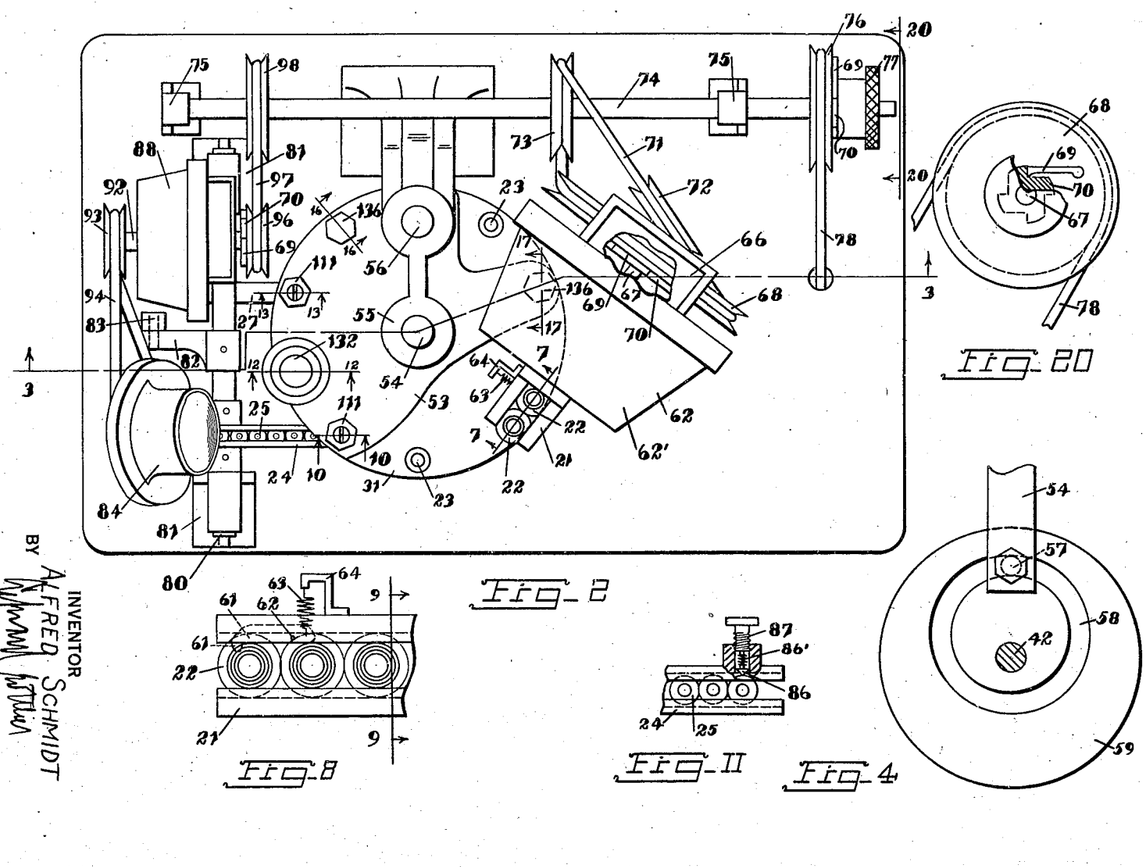
Fig. 2 is a plan view of the machine.
Fig. 4 is a fragmentary sectional view taken on the line 4—4 of Fig. 3.
Fig. 8 is a fragmentary elevational view of a portion of Fig. 7 looking in the direction of the line 8—8 thereof.
Fig. 11 is an elevational view looking in the direction of the line 11—11 of Fig. 10.
Fig. 20 is a fragmentary end view looking in the direction of the line 20—20 of Fig. 2.

A head 53 is mounted on a shaft 54 which is slidable through the bushing 32. This shaft 54 is slidably supported in its top end in a bracket 55 which is mounted on the table top 34. A stud shaft 56 is mounted on the head 53 and passes through an opening in a boss in the bracket 55 and prevents the head 53 from turning. The shaft 54 extends downwards to the bottom of the table 34 and at its lower end is formed with a flattened side 54a upon which a roller 57 is mounted. This roller moves in a cam groove 58 (see Fig. 4) of a cam 59 which is mounted on the shaft 42. This cam is arranged to reciprocate the head 53 and to cause the head 53 to travel downwards and then back up again for each revolution of the shaft 42. The Geneva drive is so arranged that it turns the disc 31 one-tenth of a revolution when the head 53 is in a raised position. The head 53 is not round but rather of fan shape, as clearly shown in Fig. 2 and supports various mechanism for acting upon the shell as hereinafter more fully described.

Figures 3, 9:
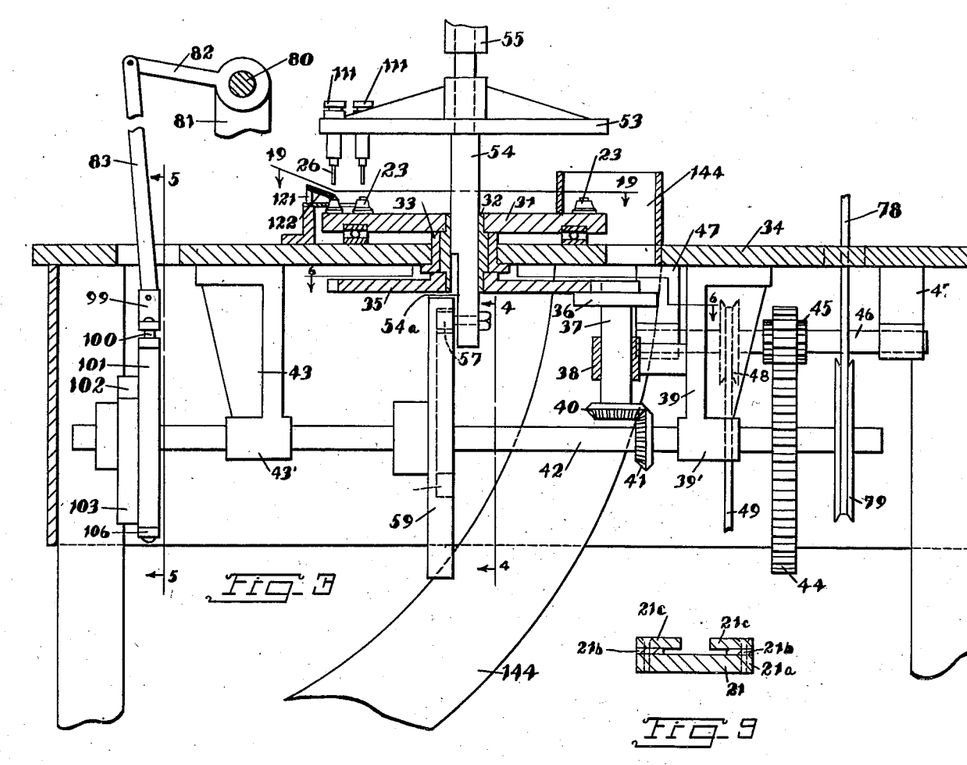
Fig. 3 is a fragmentary sectional view taken on the line 3—3 of Fig. 2.
Fig. 9 is a sectional view taken on the line 9—9 of Fig. 8.
Figures 5, 6, 7:
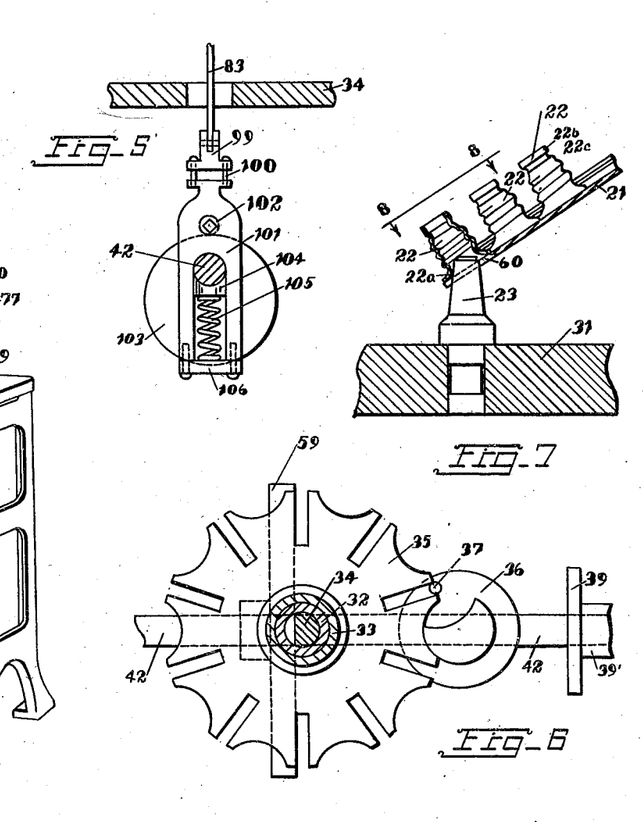
Fig. 5 is a fragmentary sectional view taken on the line 5—5 of Fig. 3.
Fig. 6 is a horizontal sectional view taken on the line 6—6 of Fig. 3.
Fig. 7 is a fragmentary sectional view taken on the line 7—7 of Fig. 2.

At each of the ten positions of the ten pins 23 there takes place a specific operation. These may be better understood by examining Fig. 19 and noting the ten positions. The position #1 is the shell loading position. The pin in this position takes off one of the shells 22 from the chute 21. This operation takes place in the following manner. The lower extremity of the chute 21 is formed with a bottom recessed portion 60 so that the pin 23 may pass through the recessed portion. There is a pivoted catch 61 on one side of the chute which holds the lowermost shell 22 in position. This catch 61 is pivoted at the point 62 and there is a spring 63 acting between one end of the catch and a bracket 64 mounted on the side of the chute for urging the catch resiliently into operative position. The chute 21 comprises merely a broad bottom strip 21a, intermediate spacer plates 21b; and spaced top plates 21c forming a T-shaped groove in transverse cross section as shown in Fig. 9. The flanged ends of the shells pass through this groove. At the lowermost position the catch 61 holds the bottom shell. The pin 23 is capable of passing through the recess 60 and into the flanged open end of the lowermost shell and merely lifting the shell off from the chute. All the shells then move downwards and the then lowermost shell is caught by the hook 61. Thus, as the disc member 31 rotates each pin picks off a shell.

The chute 21 extends upwards to a supply hopper 62. This supply hopper has an open funnel 66 into which the shells may be dropped. It also has an operating shaft 67 upon which a pulley 68 is freely mounted. This pulley carries a pawl 69 working against a ratchet 70 mounted on the shaft 67. The arrangement is such that the pulley 68 may be driven to drive the hopper, but if desired the body portion 62' of the hopper may be manually turned for operating the hopper. The details of the hopper will not be given in this specification as they form no part of the invention, such hoppers being generally known. The purpose of interposing the ratchet between the pulley 68 and the hopper is that then the hopper may be manually operated to fill up the chute 21 and it is not necessary for the machine to operate and wait until the chute 21 is filled with the shells. The pulley 68 is driven by a belt 71 which extends over a guide pulley 72 and over a drive pulley 73. This drive pulley is mounted upon a shaft 74 supported in bearings 75 mounted on the table 34. There is a main pulley 76 freely mounted on the end of the shaft 75. There is a pawl 69 mounted on the side of the pulley 76 and cooperative with a ratchet 70 on a headed bushing 77 fixed on the shaft 74. The arrangement is such that the pulley 76 may drive the shaft 74, or the knob bushing 77 may be manually turned to turn the shaft 74. It is thus possible to manually turn the shaft 74 for the purpose of filling the various chutes, as will become more apparent as this description proceeds.

The pulley 76 is driven by a belt 78 which extends through openings in the table 34 and connects with a pulley 79 mounted on the shaft 42.

The chutes 24 and 27 are fixed tangentially on a shaft 80 supported in brackets 81 mounted upon the table top 34. There is a radial arm 82 projecting from the shaft 80 and connecting with a lever 83 which extends downwards through an opening in the table top. It is apparent that if the lever 83 is reciprocated upwards and downwards the shaft 80 will be rocked and the chutes 24 and 27 will be moved accordingly. The chute 24 is associated at its top end with a hopper 84. This hopper is driven by a pulley 85. The details of this hopper will also be omitted in this specification. Suffice it to say that the washers 25 may be dropped into the hopper and they will be fed into the chute 24. They will maintain their position in the chute by reason of the lowermost washer being held by a resilient pointed member 86. This member is in the form of a sharp point on the end of a spring 86' on an adjustment screw 87 mounted on the side of the chute. The arrangement is such that the member 86 holds the lowermost washer, but does not hold it so tightly that it cannot be pulled out. It does hold it tight enough so that all of the washers in the chute above it are supported. The top of the chute 27 is associated with a hopper 88 into which the eyelets 28 are dropped. The details of this hopper will not be given since it is standard construction. The hopper will feed the eyelets down the chute 27 and the lowermost eyelet is supported by a pointed implement or member 90 resiliently supported by spring 90' on the end of an adjustable screw 91 mounted on the side of the chute. The chute 88 has a shaft 92 extending through it. On one end of the shaft there is a pulley 93. A belt 94 engages over the pulley 85. The other end of the shaft 92 is provided with a freely mounted pulley 96 carrying a pawl 69 cooperative with a ratchet wheel 70 fixed on the shaft 92. The arrangement is such that the hoppers 84 and 88 may be manually turned when desired to fill up the chutes, or the pulley 96 may be mechanically driven to operate the hoppers. There is a belt 97 which extends over the pulley 96 and over a pulley 98 upon the shaft 74. It should be noted that the shaft 74 is driving the three hoppers.

The lever 83 is pivotally connected with a bracket 99 which is adjustably connected by screws 100 with a forked member 101. The fingers of this fork straddle the shaft 42. There is a roller 102 mounted on the fork member 111 which engages against a cam 103 attached on the shaft 42. There is a block 104 mounted between the fingers of the fork 101 and engaging against the shaft 42. There is a spring 105 acting between this block and a bar 106 mounted between the ends of the fingers of the fork. The spring 105 acts to normally urge the roller 102 against the cam 103. Thus, as the cam operates the fork 101 will be reciprocated upwards and downwards and so reciprocate the lever 85 which in turn rocks the shaft 82. The cam 103 is so arranged that the free end of the chutes 24 and 27 will be located at the positions #3 and #5 (see Fig. 19) when the head 53 is just starting to descend and the pins 26 will engage the lowermost washer and eyelet to take it out of the chutes as hereinafter more fully described. Once the washer and eyelet are engaged and held by the pins 26 the chutes will pivot away and so the washer and eyelet are withdrawn.

The pin 23 at the point 2 (see Fig. 19) merely carries the shell which it picked up at the point 1. The position 2 is a blank position and nothing happens here. The head 53 is cut out over the point 2. At the point 3 one of the washers 25 is drawn out from the chute 24 and deposited into the shell 22 which is on the pin 23 at this point. This operation takes place as follows (see Fig. 10). The pin 26 is attached to a piston 109 which works in the hollow of a screw 110 threadedly mounted through the head 53. This screw 110 has a head 111 beneath which there is a suitable spacer washer 112 and a nut 113 to hold the screw in proper position. A spring 114 is housed within the hollow of the screw 110 and acts between the head 109 and a plug 115 mounted in the upper end of the screw. The lower end of the screw 110 is formed with a reduced threaded portion 116 upon which a clamping tool 117 is mounted. This clamp tool has a clamping surface 117a.

When the head 53 starts traveling downwards the pin 26 engages through the central opening in the lowermost washer 25 and strikes against the top of the pin 23. The washer is now held and as the chute 24 pivots away from its position the washer is drawn out from the chute. It then falls down into the bead end of the shell 22 and upon the pin 23. As the head 53 continues traveling downwards the pin 26 will be forced upwards within the screw 110 and merely depresses the spring 114. When the head 53 reaches the lowermost position the tool 117 will slightly clamp the edges of the shell 22 inwards into a position as shown in Fig. 12.

Figure 19:
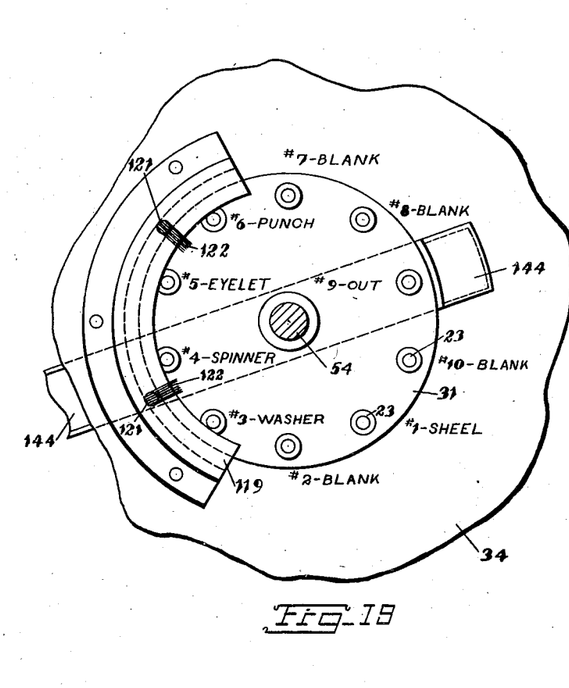
Fig. 19 is a horizontal sectional view taken on the line 19—19 of Fig. 3.

From the points 3 to 6 inclusive of Fig. 19 there is a holding flange 119 (see also Fig. 3) which engages over the flange ends of the shells 22 which are mounted on the pins in these positions to prevent the shells from accidentally being lifted off the pins when the head 53 and the tools carried by this head move upwards. This flange 119 is mounted on a bracket 120 which is mounted on the table 34. Between the points 3 and 4 and the points 5 and 6 there are vertical posts 121 upon which brushes 122 are mounted. These brushes extend downwards so that as the disc member 31 rotates they brush over the heads of the pins. If there are shells 22 on the pins, nothing happens. If the pins have no shells and if accidentally a washer 25 or an eyelet 28 has been deposited on to the top of the pins, these parts will be brushed off and merely fall to the table and so prevent subsequent interference with the proper operation of the machine.

Figure 13:
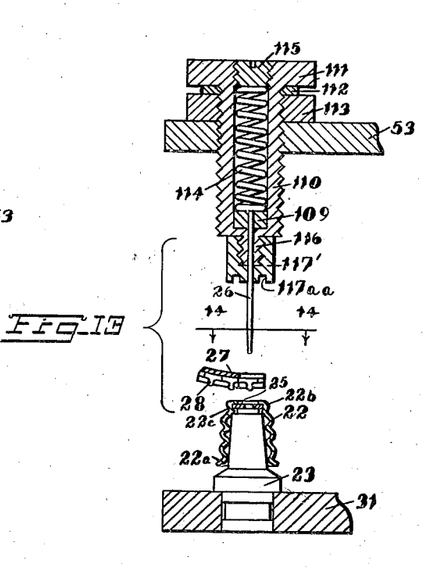
Fig. 13 is a sectional view taken on the line 13—13 of Fig. 2.
Figure 14:
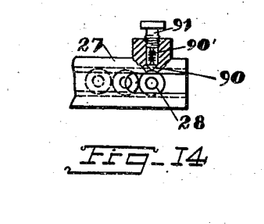
Fig. 14 is a fragmentary elevational view looking in the direction of the line 14—14 of Fig. 13.

At the point 4 (see Fig. 19) there is a spinning device which turns the loosely clamped edge of the shell as shown in Fig. 12, downwards so that it is in the condition as shown in Fig. 13. This spinning device comprises a shank 123, the lower end of which has a cupped portion 123a in which there is a shaft 124 along a diameter thereof. On this shaft there are a pair of spaced rollers 125 adapted to engage against the edges of the shell to turn them down. The shank 123 is rotative in bearings 126 which are mounted in a screw 127 threadedly engaged through the head 53. This screw 127 has a head 128 which engages against a spacer washer 129. A lock nut 130 is also engaged on the screw 127. There is a plate 131 mounted on top of the head 128 and a small electric motor 132 is mounted on this plate and is connected to drive the shank 123. A suitable gear reduction unit, not shown in detail on the drawing, may be incorporated within the housing of the electric motor to reduce the turning speed of the shank 123.

At the point 5 (see Fig. 19) an eyelet is removed from the chute 27 and deposited through the opening in the washer 25 which is in the shell 22 on this pin. The mechanism for removing this eyelet is shown in Fig. 13. It is a mechanism which is substantially identical to that shown in Fig. 10 and the same parts may be recognized by the same reference numerals. It distinguishes merely in the tool portion 117'. This tool portion has a bottom operating face 117aa of a form adapted to clamp in a removed eyelet. The operation consists essentially in the pin 26 moving downwards into the upper most eyelet 28 which is in the chute 27, and then as the chute pivots holding this eyelet and dropping the eyelet through the opening in the washer which is directly below. The pin then maintains its position within the eyelet while the head 53 is descending until the tool 117' acts against the eyelet and serves to clamp or flatten out the eyelet within the opening in the washer.

Figures 16, 17, 18:
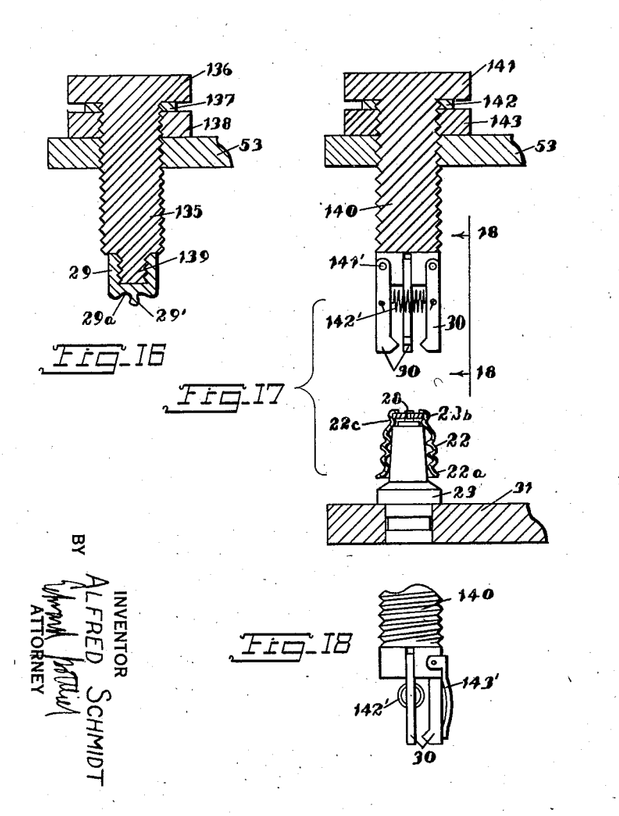
Fig. 16 is a sectional view taken on the line 16—16 of Fig. 2.
Fig. 17 is a sectional view taken on the line 17—17 of Fig. 2.
Fig. 18 is a fragmentary elevational view looking in the direction of the line 18—18 of Fig. 17.

At the point 6 (in Fig. 19) the punch shown in Fig. 16 operates. This punch comprises merely a screw 135 which is threadedly engaged through the head 53. This screw has a head 136 acting against a spacer washer 137, which in turn acts against a lock nut 138. The lower end of the screw 135 has a reduced portion 139 upon which the tool 29 is mounted. This tool has a beaded head 29' adapted to extend into the hollow of the eyelets 28 and it has a curved base 29a adapted to engage over the eyelet and also over the spinned down edge of the shell. This tool acts against the top of the pin 23 which is at the sixth point. The result of the operation is to tightly clamp the various parts of the assembled shell together.

The points 7 and 8 (see Fig. 19) are blank positions. In this respect note Fig. 2 and note that the head 53 is cut out to avoid these positions. At the point 7 the guide rod 56 is located which prevents the head from turning. At the point 9 there is a mechanism for removing the finished shell. This mechanism is shown in detail in Figs. 17 and 18. It comprises, essentially, a screw 140 threadedly engaged through the head 53. This screw has a head 141 which acts against a spacer washer 142, which in turn rests against a lock nut 143. The lower end of the screw 140 supports the three fingers 30. Each finger is pivotally mounted at the upper end by a pintle 141'. These three fingers are arranged so that two of the fingers are directly opposite each other, and the third finger is located at one side 90° from each of the fingers. The two fingers opposite each other are drawn together by a spring 142'. The third finger 30 is urged inwards by a flat spring 143' mounted on the bottom of the screw 140. The arrangement is such that when the head descends the fingers will be spread apart and engage the outside of the shell 22 which is located on the pin 23 beneath these fingers. When the head moves upwards the fingers will draw off the shell 22 from the pin 23 as long as the shell engages against the pin. But when it is lifted to a certain position the central finger 30 will throw it out from between the diametrically opposite fingers 30. It will then be thrown into a chute 144 mounted upon the top of the table 34. This chute extends downwards beneath the table and may discharge into a receiving box.

The operation of the device is as follows:

Rotations from the motor 51 indirectly drive the shaft 42. Rotations from the shaft are transmitted by the gears 41 and 42 and indirectly drive the Geneva wheel 35 which periodically turns one point. The cam 59 which is mounted on the shaft 42 will reciprocate the rod 53 downwards and upwards, one complete cycle for each turn of the shaft 42. This will move the head 53 down and then up. The cam 103 on the shaft 42 will indirectly cause the lever 83 to reciprocate vertically, which in turn will pivot the stud shaft 80 and chutes 24 and 27. The chute 24 supplies washers, while the chute 27 supplies eyelets.

As the disc member 31 rotates the pins 23 on it will pass the bottom of the chute 21 and lift off one shell each. As the disc member 31 continues to rotate these shells will respectively pass the chutes 24 and 27. The chute 24 and mechanism on the head 53 deposits a washer into the shell. The chute 27 and mechanism on the head 53 deposits an eyelet into the washer. Certain mechanism on the head 53 will tightly clamp together the washers, the eyelets, and the shells. There is a mechanism for removing the assembled shell and discharging it through the chute 144.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent, is:

1. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shells and rest on said beads, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin.

2. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet washer and shell into a fixed unit, and means for removing said unit from said pin, said means for depositing the eyelet into the washer also acting to slightly flatten the eyelet so that it maintains its position.

3. In a shell assembling machine, a chute for supplying and holding hollow shells each having a flange end with a bead spaced in slightly from the end thereof, a pin for receiving one of said shells at a time and holding said shell with its beaded and at the outer end of the pin, means for depositing one of said shells on said pin including a member moving relative to said chute, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, said chute for said shells being provided with a spring catch at its lower end which supports the lowermost shell at an inclination with its open bottom end exposed, and said pin being mounted on said moving member to engage into said open bottom end of the said lowermost shell so that as the pin passes the lowermost inclined shell it lifts it out of the chute.

4. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the center opening of the washer held in said shell which is on said pin, a punch for coacting with said pin for clamping said eyelet, washer and shell into a fixed unit, and means for removing said unit from said pin, mechanically driven hoppers, and said chutes being supplied with the shells with the washers and with the eyelets from said mechanically driven hoppers, and means associated with said hoppers by which said hoppers may be manually operated.

5. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, said chute for the washers being provided with a catch at its lower end adapted to releasably hold the lower washer, and the other washers being merely rested against the lower one so that when the lower one is removed they advance.

6. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, said chute for supplying and holding the eyelets includes a catch adapted for holding the lowermost eyelet upon which the other eyelets in turn are rested against.

7. In a shell assembling machine, a chute for supplying and holding hollow shells each having a flange end with a bead spaced in slightly from the end thereof, a pin for receiving one of said shells at a time and holding said shell with its beaded end at the outer end of the pin, means of depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit for said pin, said means for depositing one of said eyelets comprising a descending head having a tool with a resiliently projecting pin capable of engaging into the eyelet to hold it and guide it into proper position and then to becoming stationary as the head comes down completely for the tool to operate.

8. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, and a movable head for supporting said punch.

9. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, comprising a vertically reciprocable head, hooks pivotally mounted on said head and adapted to automatically spread over the shell when the head moves downwards, resilient means urging said hooks together, and said hooks being arranged in an opposed pair and a third one at right angles to the pair so that when the head moves upwards the third hook forces out the shell from between the other two hooks.

10. In a shell assembling machine a periodically rotative disc member, a plurality of pins for holding hollow shells mounted on said disc member, a head with tools thereon synchronized to move down and then up in the periods that the said disc member is stationary, a chute for supplying shells on said pins, a chute for supplying washers at one position of said disc member into said shells, a chute for supplying eyelets into said washers at another position on said disc member, and an element engaging over the bottom ends of the shells upon said pins for holding the shells from being accidentally lifted off when the head with the tools moves upwards.

11. In a shell assembling machine a periodically rotative disc member, a plurality of pins for holding hollow shells mounted on said disc member, a head with tools thereon synchronized to move down and then up in the periods that the said disc member is stationary, a chute for supplying shells on said pins, a chute for supplying washers at one position of said disc member into said shells, a chute for supplying eyelets into said washers at another position on said disc member, and an element engaging over the bottom ends of the shells upon said pins for holding the shells from being accidentally lifted off when the head with the tools moves upwards and brushes for sweeping the tops of the pins as the disc member moves from brushing off washers or eyelets deposited on the pins should said pins lack one of said hollow shells.

12. In a shell assembling machine, a chute for supplying and holding hollow shells each having a flange end with a bead spaced in slightly from the end thereof, a pin for receiving one of said shells at a time and holding said shell with its beaded end at the outer end of the pin, means for depositing one of said shells on said pin, a chute for supplying and holding washers with center openings adapted to fit into the beaded end of said shell and rest on said bead, means for depositing one of said washers into the beaded end of a shell on said pin and crimping the edge of said shell to hold the washer in place on said bead, a chute for supplying and holding eyelets adapted to fit into the center openings of said washers, means for depositing one of said eyelets into the central opening of the washer held in said shell which is on said pin, a punch for coacting with said pin for clamping said eyelet, washer and shell into a fixed unit, and means for removing said unit from said pin, a rocker shaft, said chute for supplying and holding the washers and said chute for supplying and holding the eyelets being radially fixed upon said rocker shaft, and means for rocking said shaft to place said chutes into operative or inoperative positions synchronized with the operations of said means for depositing the washers and depositing the eyelets.

13. In a shell assembling machine a rotative disc member, a plurality of pins for holding hollow shells mounted on said disc member, a head with tools thereon synchronized to move down and then up in the periods that the said disc member is stationary, a chute for supplying shells on said pins, a chute for supplying washers at one position of said disc member into said shells, a chute for supplying eyelets into said washers at another position on said disc member, and means for periodically rotating said disc member comprising a Geneva drive connected with the disc member and operated from a drive shaft.

14. In a shell assembling machine a rotative disc member, a plurality of pins for holding hollow shells mounted on said disc member, a head with tools thereon and means for moving said head synchronized to move the head down and then up in the periods that the said disc member is stationary, a chute for supplying shells on said pins, a chute for supplying washers at one position of said disc member into said shells, a chute for supplying eyelets into said washers at another position on said disc member, and means for periodically rotating said disc member comprising a Geneva drive connected with the disc member and operated from a drive shaft, said means for moving said head comprising a cam mounted on said drive shaft and operating a shaft supporting said head.

15. In a shell assembling machine, a periodically rotating disc, a head, means for causing said head to move downwards upon the disc and then upwards while the disc is stationary, pins for supporting hollow shells mounted upon said disc, a screw mounted through said head, a pin resiliently projecting from said screw and adapted to cooperate with an element for dropping the element into the shell, and a tool mounted upon said screw for clamping the shell and element together.

16. In a shell assembling machine, a periodically rotating disc, a head, means for causing said head to move downwards upon the disc and then upwards while the disc is stationary, pins for supporting hollow shells mounted upon said disc, a screw mounted through said head, a pin resiliently projecting from said screw and adapted to cooperate with an element for dropping the element into the shell, and a tool mounted upon said screw for clamping the shell and element together, said head being also provided with a spinning tool for operating on the partially assembled parts.

17. In a shell assembling machine, a chute for supplying at one point and holding hollow shells each having a flange end with a bead spaced in slightly from the end thereof, pins for receiving one of said shells each at said point and holding said shells with their beaded ends at the outer ends of the pins, a chute for supplying at another point and holding washers with center openings adapted to fit into the beaded end of said shells on the pins and rest on said bead, means at said latter point for depositing one of said washers into the beaded end of each shell on said pins and crimping the edges of said shells to hold the washers in place on said beads, a chute for supplying and holding eyelets at another point adapted to fit into the center openings of said washers, means at said latter point for depositing one of said eyelets into the central opening of each washer held in each shell which is on said pins, a punch at another point for coacting with said pins for clamping said eyelet, washer, and shell on each pin into a fixed unit, and means at another point for removing said unit from said pin, and a periodically moving member for supporting said pins successively at said points.

18. In a shell assembling machine a rotative disc member, a plurality of pins for holding hollow shells mounted on said disc member, a head with tools thereon synchronized to move down and then up in the periods that the said disc member is stationary, a chute for supplying shells on said pins, a chute for supplying washers at one position of said disc member into said shells, a chute for supplying eyelets into said washers at another position on said disc member, and means for periodically rotating said disc member comprising a drive shaft, a Geneva drive connected with the disc member and operated from said drive shaft, said means for synchronizing said head comprising a shaft for supporting said head, a cam mounted on said drive shaft and operating said shaft supporting said head, a lever, another cam on said shaft and connected with said lever, a rocker arm connected with said lever to periodically pivot and support the chute for holding the washers and also the chute for holding the eyelets and periodically placing these chutes into operative positions between said head and disc member.

ALFRED SCHMIDT.